(12) United States Patent
Fenton et al.

(10) Patent No.: US 7,004,363 B2
(45) Date of Patent: Feb. 28, 2006

(54) SHOULDER STRAP PAD

(75) Inventors: Timm J. Fenton, Lebanon, NJ (US);
Leo S. Chang, Portand, OR (US)

(73) Assignee: Tumi, Inc., South Plainfield, NJ (US)

( * ) Notice: Subject to any disclaimer, the term of this patent is extended or adjusted under 35 U.S.C. 154(b) by 379 days.

(21) Appl. No.: 10/394,383

(22) Filed: Mar. 21, 2003

(65) Prior Publication Data

US 2004/0185247 A1    Sep. 23, 2004

(51) Int. Cl.
*A45F 15/02* (2006.01)
(52) U.S. Cl. ...................... 224/264; 224/642
(58) Field of Classification Search .............. 224/264, 224/642
See application file for complete search history.

(56) References Cited

U.S. PATENT DOCUMENTS

| | | | | |
|---|---|---|---|---|
| 3,883,053 A | * | 5/1975 | Pritchard et al. | 224/264 |
| 5,018,652 A | * | 5/1991 | Holtzclaw, Jr. | 224/150 |
| 5,292,044 A | * | 3/1994 | Reimers | 224/264 |
| 5,765,735 A | * | 6/1998 | Kimchi et al. | 224/264 |
| 5,961,019 A | * | 10/1999 | Gleason et al. | 224/643 |
| 6,223,959 B1 | * | 5/2001 | Chen | 224/264 |
| 6,318,609 B1 | * | 11/2001 | Swierz | 224/264 |
| 6,915,932 B1 | * | 7/2005 | Wolfe | 224/264 |

* cited by examiner

*Primary Examiner*—Stephen K. Cronin
(74) *Attorney, Agent, or Firm*—Baker Botts L.L.P.

(57) ABSTRACT

A shoulder strap pad for carrying a bag on the shoulder includes a load-bearing backing member attached to or integral with the shoulder strap and a resilient cushion attached to the lower side of the backing member. The lower surface of the cushion is covered by a non-abrasive material and is formed with a plurality of raised pads for contacting the shoulder and a lengthwise-extending padded collar region along the inner side thereof for protecting the exposed surfaces of the neck and/or shoulder against chafing.

29 Claims, 6 Drawing Sheets

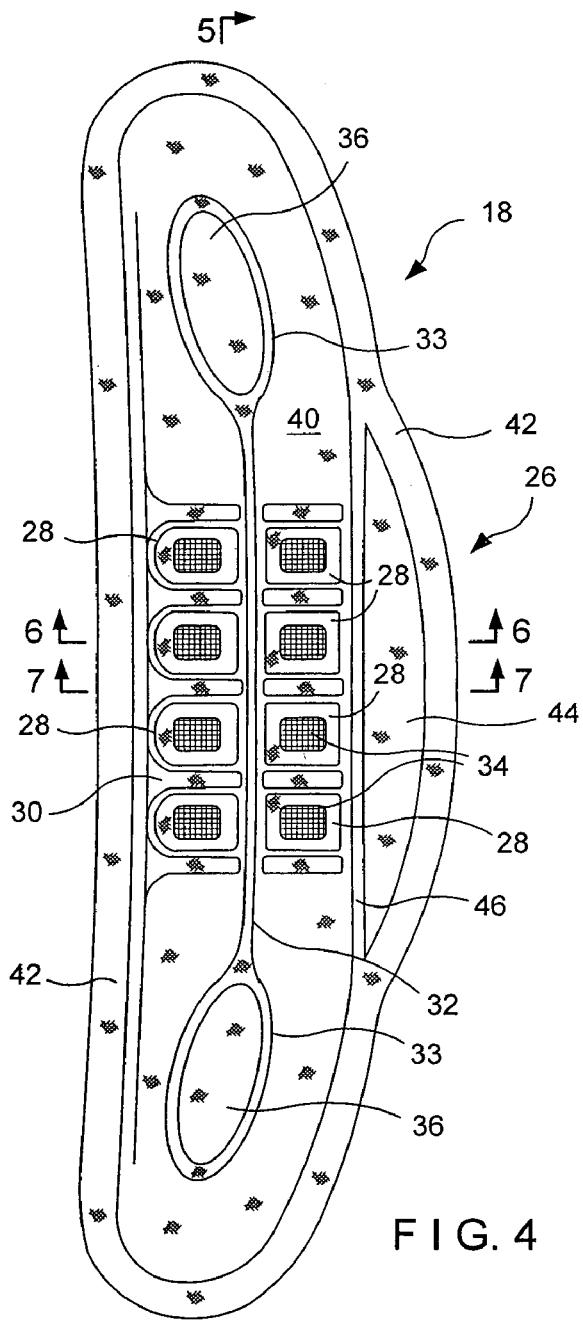
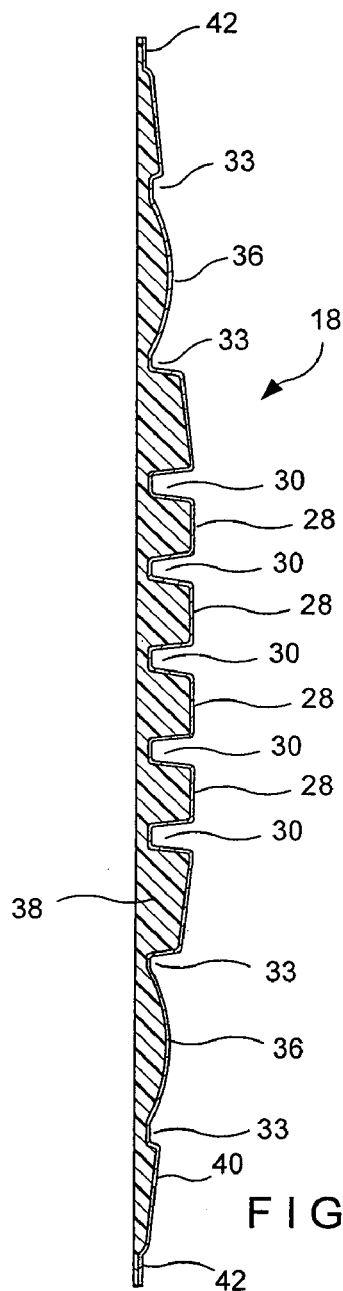
FIG. 4
FIG. 5
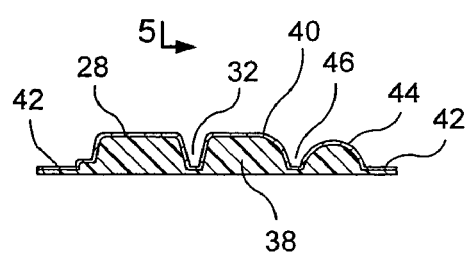
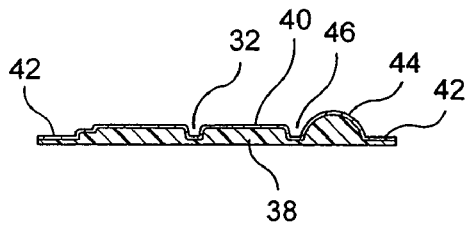
FIG. 6
FIG. 7

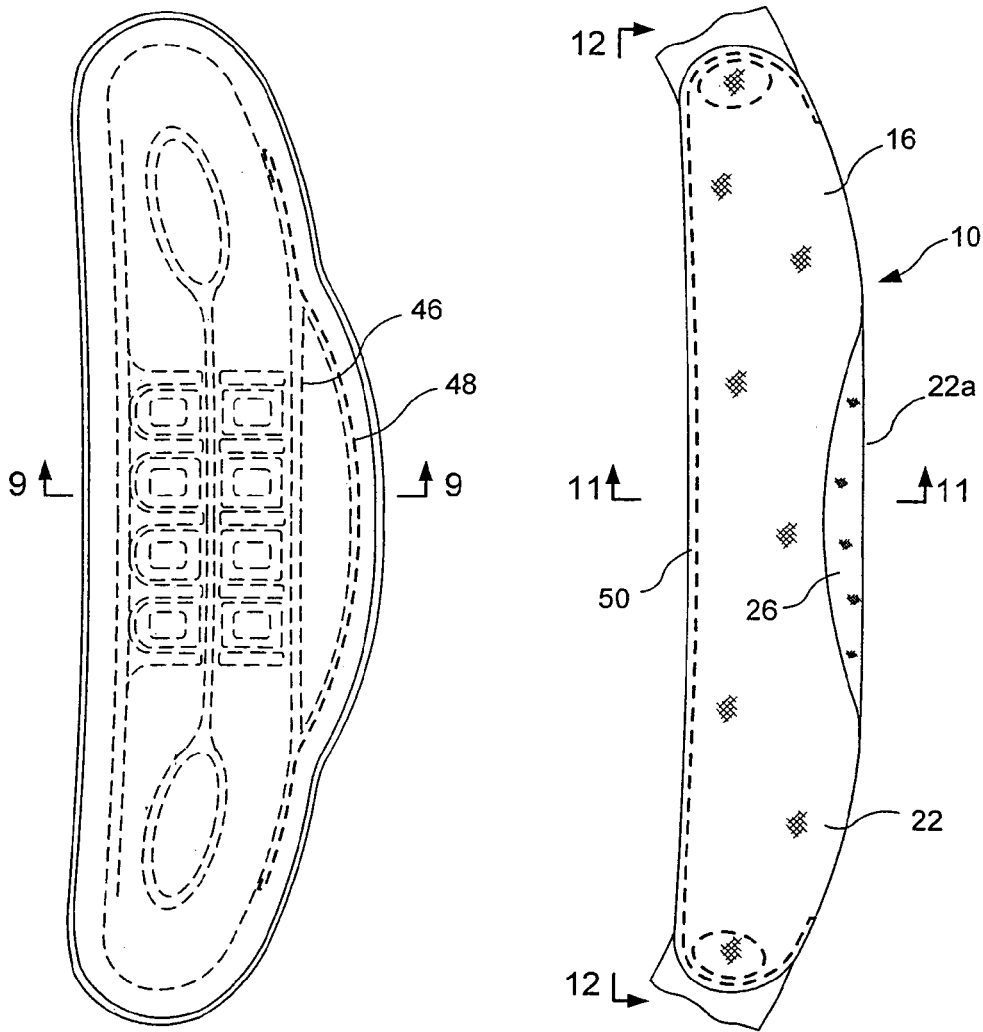
FIG. 8
FIG. 10
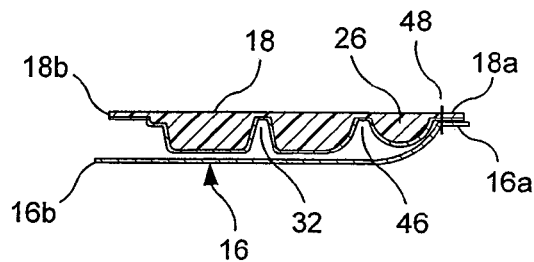
FIG. 9
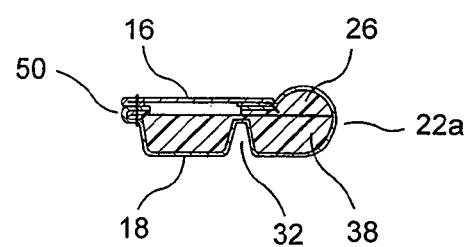
FIG. 11

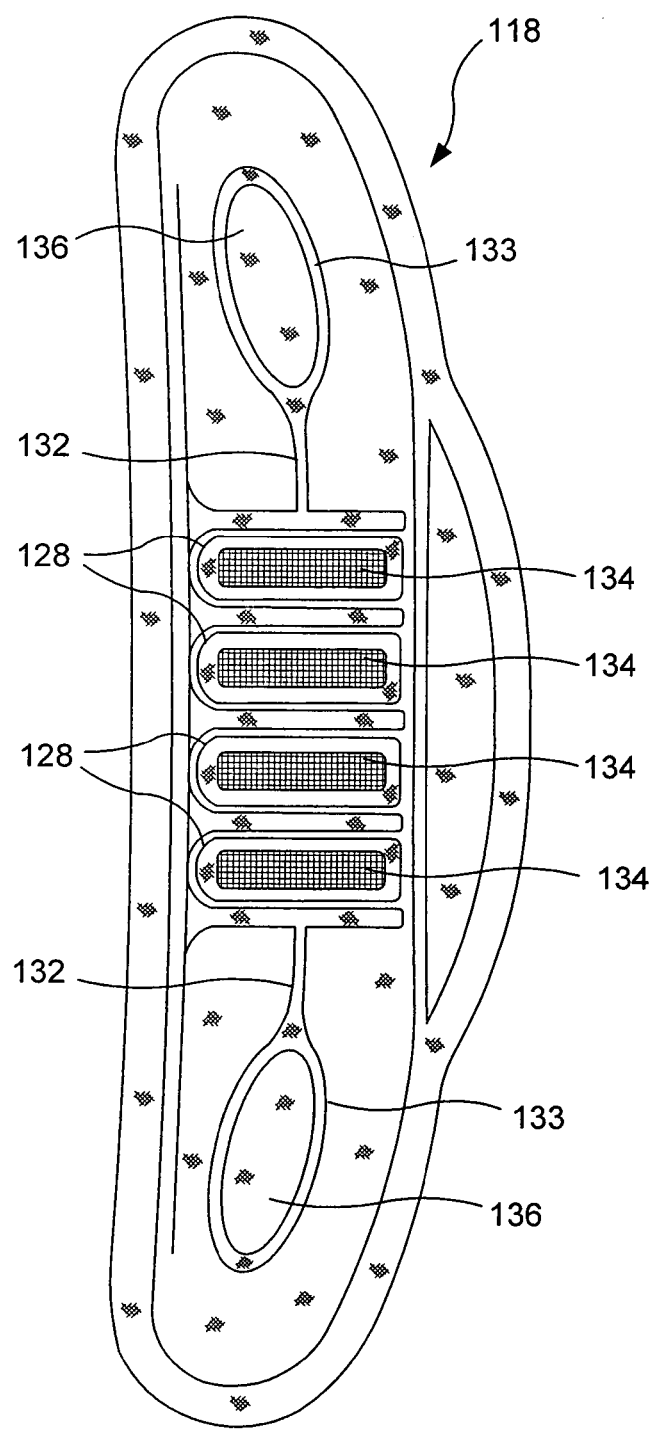
F I G. 14

SHOULDER STRAP PAD

BACKGROUND OF THE INVENTION

1. Field of the Invention

The present invention related to shoulder straps for carrying luggage, briefcases, totes, duffels, and the like (hereinafter "bags"), and more particularly to a novel shoulder pad for use with such straps and to a shoulder strap embodying the novel pad.

2. The Related Art

Shoulder straps are widely used with many different types of bags. For the user's comfort, shoulder pads of various constructions and configurations have been provided on the straps. In one such configuration, the pad is generally crescent shaped so as to conform to the natural curvature and slope of the shoulder when in use. When correctly positioned on the shoulder, the convex edge of the shoulder pad faces inward towards the user's neck and the concave edge faces outward towards the arm. It frequently occurs, however, through accident or mistake, that users reverse the orientation of the pad, so that the concave edge faces the neck and the convex edge faces the arm. This results in improper load distribution on the shoulder and increased stress and discomfort to the user.

Another disadvantage of previously known shoulder strap pads is that the surfaces of the pad facing the user's shoulder and neck are covered by high-strength, abrasion-resistant material, such as the ballistic nylon or other materials conventionally used to cover bags. Although desirable for load-support purposes, such materials tend to chafe exposed areas of the user's skin that come into contact with the shoulder pad.

A need exists in the art, therefore, for a shoulder strap pad which overcomes the foregoing and other disadvantages of known pads.

SUMMARY OF THE INVENTION

The foregoing and other needs of the prior art are met, in accordance with the invention, by the provision of a shoulder strap pad including an elongated, load-bearing backing member, having an inner edge which is convexly curved over at least the regions thereof adjacent to the ends of the backing member, and an elongated cushion attached to the lower surface of the backing member. The cushion is comprised of a resilient substrate having an inner edge which is convexly curved over at least its end regions and which has a central collar region. The lower surface of the cushion is covered by a non-abrasive material and has formed thereon a plurality of raised pads. The raised pads are spaced apart in the lengthwise direction of the substrate by transversely extending grooves to permit the substrate, and thus the shoulder pad, to flex and conform to the shoulder of the user. The collar region of the substrate is turned up and folded back so as to overlie the upper surface of the transversely adjacent region of the substrate, whereby the non-abrasive material on the lower surface of the collar region forms the inner edge of the shoulder pad over the length of the collar region. The collar region thus provides a non-abrasive surface over that portion of the shoulder pad most likely to come into contact with the exposed surfaces of the user's neck and shoulder when a bag is being carried.

According to another feature of the invention, the collar region of the substrate preferably includes a lengthwise-extending raised pad on its lower surface. A lengthwise-extending groove in the lower surface of the substrate separates the collar pad from the adjacent raised pads, and forms a fold line about which the collar region of the substrate is turned up and folded back over the adjacent substrate region. With this construction, not only is the inner edge of the shoulder pad covered by non-abrasive material over the collar region, but it is padded as well for greater comfort and protection. Preferably, the substrate is attached to the backing member along the respective inner edges thereof by an inverted seam, so that the inner surface of the collar region is free of any seam that might chafe the neck of the user.

The cushion component of the shoulder pad is preferably formed of moldable synthetic material, e.g., ethyl vinyl acetate foam, and the non-abrasive material on its lower surface is preferably a stretchable synthetic material, e.g., nylon fabric.

The invention also pertains to a shoulder strap embodying a pad of the foregoing construction. The shoulder strap pad may be attached at its ends to the adjacent ends of a two-piece strap, which is adapted to be attached at each free end to a bag. Alternatively, the shoulder strap pad may be an integral part of a single-piece shoulder strap. In the latter case, the strap itself could comprise the backing member, with the cushion being attached directly thereto.

BRIEF DESCRIPTION OF THE DRAWINGS

For a better understanding of the invention reference may be made to the following description of exemplary embodiments thereof, taken in conjunction with the accompanying drawings, in which:

FIG. 4 is a bottom view of the resilient cushion component of the embodiment of the shoulder strap pad shown in FIG. 1;

FIG. 5 is a lengthwise cross-sectional view of the cushion component of FIG. 4, taken along the line 5—5 and looking in the direction of arrows;

FIG. 6 is a transverse cross-sectional view of the cushion component of FIG. 4, taken along the line 6—6 and looking in the direction of the arrows;

FIG. 7 is a transverse cross-sectional view of the cushion component of FIG. 4, taken along the line 7—7 and looking in the direction of the arrows;

FIG. 8 is a top view of the cushion component shown in FIG. 4, showing in dashed lines the seam attaching the inner edge of the cushion to the load-bearing bracing member;

FIG. 9 is a transverse cross-sectional view taken along the line 9—9 in FIG. 8 and looking in the direction of the arrows;

FIG. 10 is a top view of the shoulder strap pad embodying the cushion component of FIG. 8, showing the seam attaching the outer edge of the cushion to the backing member;

FIG. 11 is a cross-sectional view taken along the line 11—11 in FIG. 10 and looking in the direction of the arrows;

FIG. 14 is a bottom view of another embodiment of a cushion component for a shoulder strap pad in accordance with the invention.

DETAILED DESCRIPTION OF EXEMPLARY EMBODIMENTS

Figure 1:
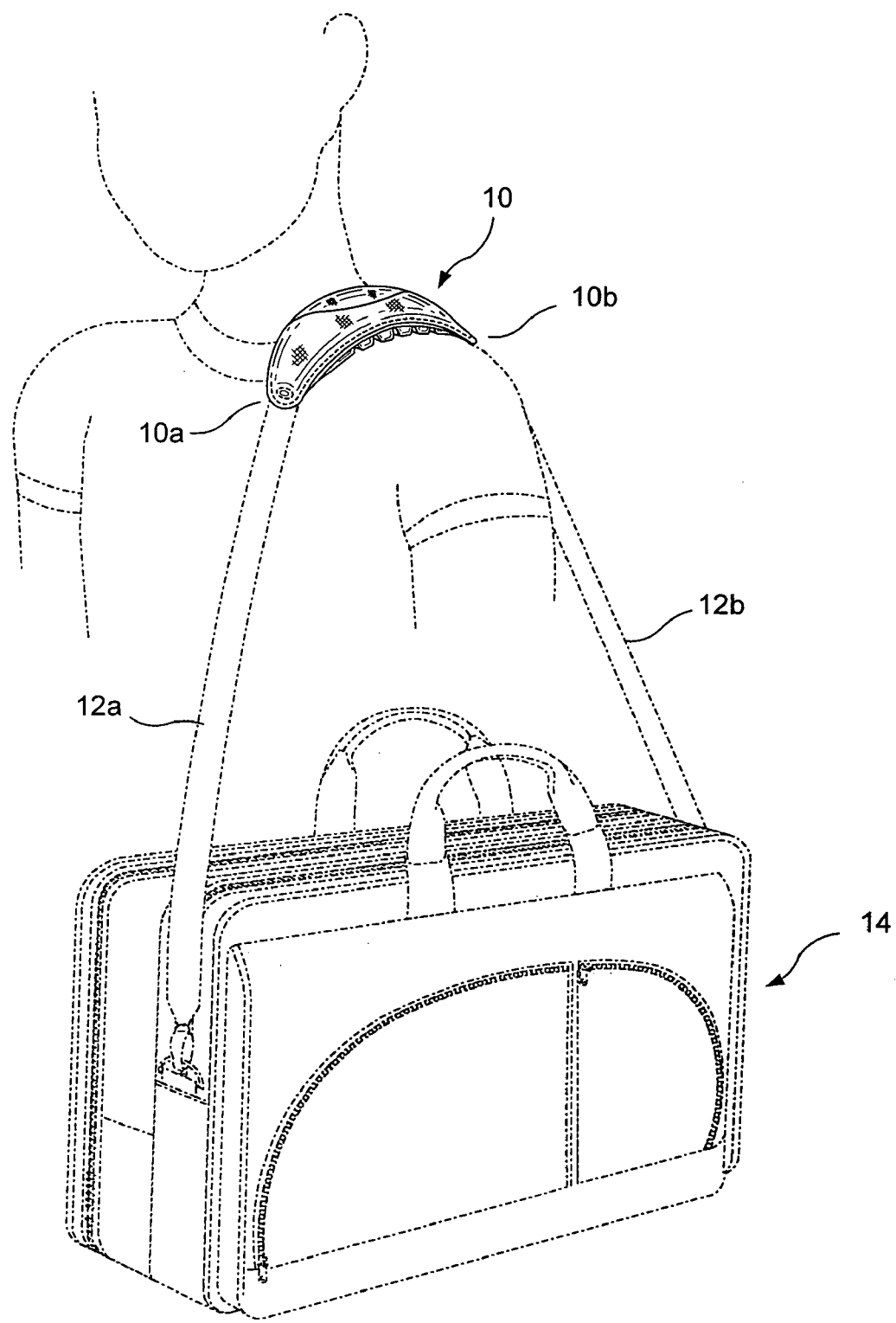
FIG. 1 is a perspective view of one embodiment of a shoulder strap pad in accordance with the invention.

FIG. 1 illustrates an embodiment of a shoulder strap pad 10 in accordance with the invention in position on the shoulder of a user (shown in phantom) and attached at its ends 10a, 10b to the respective ends of a pair of shoulder straps 12a, 12b which are attached at the other ends thereof to a bag 14. The bag 14 may be of any known type, and the straps 12a, 12b may be of any known material and construction, e.g., webbing, conventionally used for shoulder straps.

Throughout the specification and claims, the terms "upper" and "lower" are used with reference to the vertically upward and vertically downward directions, respectively, as seen in FIG. 1. The term "inner" means in the direction towards the neck of the user, and the term "outer" means in the direction towards the user's arm. These meanings used, as a matter of convenience, to establish a frame of reference in describing the relative positions of the various components of the embodiments of the shoulder strap pad disclosed herein, and are not intended to be limitative.

Figure 2:
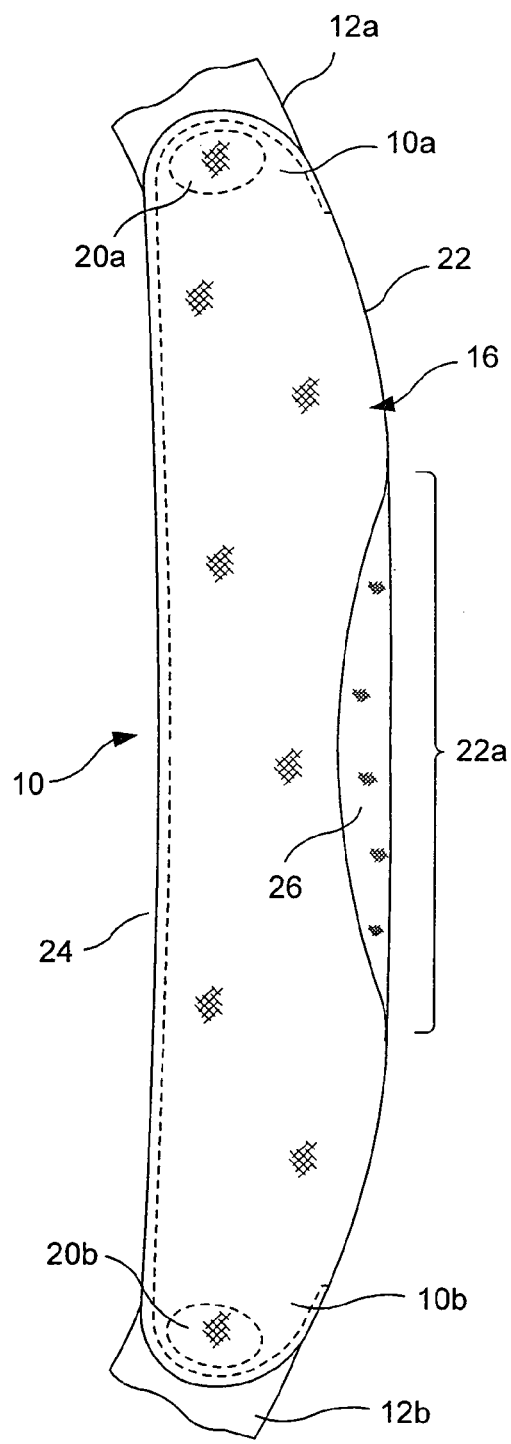
FIG. 2 is a top view of the embodiment of the shoulder strap pad shown in FIG. 1.
Figure 3:
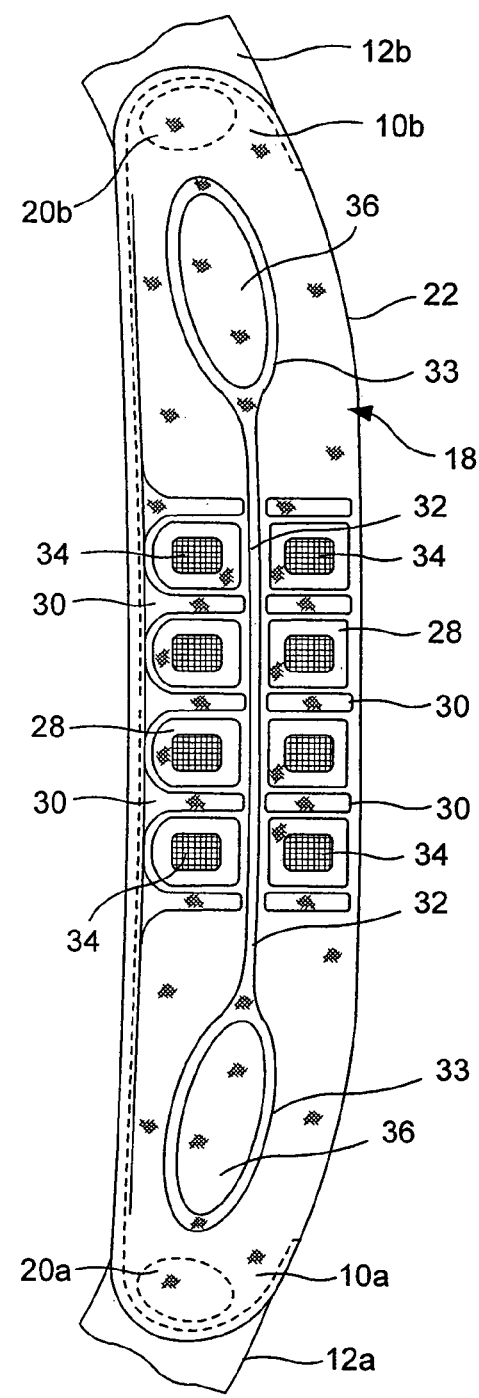
FIG. 3 is a bottom view of the embodiment of the shoulder strap pad shown in FIG. 1.

As shown in FIGS. 2 and 3, which are respectively top and bottom views of the shoulder strap pad of FIG. 1, the pad 10 includes a backing member 16 on its upper side and a resilient cushion 18 on its lower side. In the embodiment of FIGS. 2 and 3, the backing member 16 and the cushion 18 are preferably substantially coextensive in size, although this is not necessary. The backing member 16 and the cushion 18 are stitched together along their peripheries in a manner described more fully hereinafter.

In this embodiment, the backing member 16 is intended to support the weight of the bag 14. It therefore is preferably made of a high-strength fabric, such as the ballistic nylon conventionally used to cover bags. Any suitably strong, flexible material may of course be used. If desired, a flexible stiffening member (not shown) can be inserted between the backing member 16 and the cushion 18.

At its ends 10a, 10b, the pad 10 is sewn or otherwise suitably attached, as indicated at 20a, 20b, to the ends of the respective shoulder straps 12a, 12b. Alternatively, the backing member 16 could be an integral part of a continuous, single-piece shoulder strap, with the cushion being attached directly thereto.

As seen in FIGS. 2 and 3, the inner edge 22 of the pad 10 is preferable convexly curved at least in the regions adjacent to the ends 10a, 10b thereof. If desired, the convex curvature may continue through the full length of the pad 10. The pad's outer edge 24 may be substantially straight as shown or, alternatively, concavely curved. As noted above, such curved configuration of the shoulder strap pad 10 better conforms to the shape and slope of the shoulder.

Centrally of the pad 10, the cushion 18 includes a collar region 26 which, as described hereinafter, is turned up and folded back to form a portion 22a of the inner edge of the pad 10. The cushion region 26 fulfills two functions: it protects the skin of the users neck and/or shoulder against chafing by the shoulder strap, and it clearly identifies the inner side of the pad, i.e., the side that is to be positioned next to the neck. This dual-purpose function of the pad 10 not only improves the comfort of the user, but also minimizes the likelihood that the user will incorrectly mount the pad on his shoulder.

Figure 12:
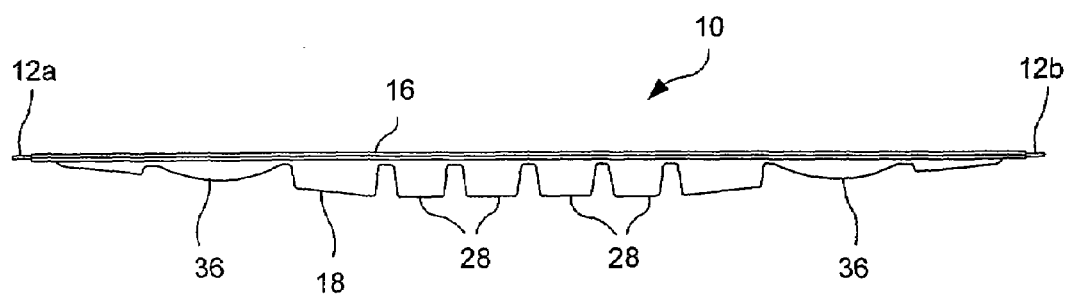
FIG. 12 is a side view embodiment of the shoulder strap pad of FIG. 2 in a flat, unflexed state.
Figure 13:
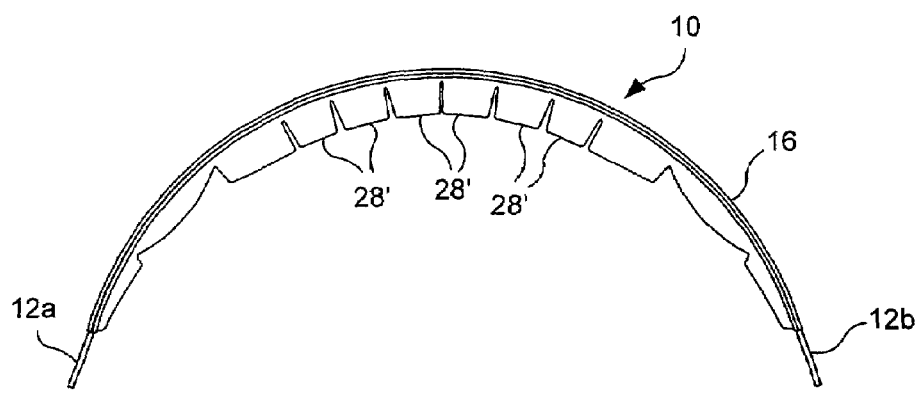
FIG. 13 is a side view of the embodiment of the shoulder strap pad of FIG. 2 in a flexed state.

On its lower surface (shown in FIG. 3), the cushion 18 preferably includes a plurality of raised pads 28 that are separated in the lengthwise direction by transversely extending grooves 30 which permit the pad 10 to flex lengthwise, as illustrated in FIGS. 12 and 13, to conform to the user's shoulder. In the embodiment of FIG. 3, the pads 10 are also separated in the transverse direction by a lengthwise extending groove 32, so that the individual raised pads 28 are generally square in plan. The grooves 30 and 32 also serve to ventilate the space between the pad 10 and the shoulder, which further enhances the user's comfort. To that end, the lengthwise groove 32 may be extended towards the ends 10a, 10b of the pad and include portions 33 which, for example, define and ventilate a further raised pad 36 adjacent each end 10a, 10b.

A non-slip material 34, is preferably provided on at least a portion of the lower surface of each pad 28 to retard slippage of the pad 10 on the shoulder during use. Preferably, the non-slip material is screen printed onto the pad surfaces, and may comprise polyurethane, silicone, rubber, or other suitable material.

FIGS. 4–7 illustrate a preferred structure of the cushion component 18 per se of the embodiment of FIGS. 2 and 3. As there shown, the cushion comprises a substrate 38 of a moldable synthetic material, e.g., ethyl vinyl acetate foam, which is covered on its lower surface by a stretchable synthetic material 40, e.g., nylon fabric. In accordance with the invention, the material 40 covering the lower surface of the substrate 38 is a non-abrasive material such as that sold commercially under the trademark Lycra.

The cushion 18 is preferably formed as a composite structure by adhering the stretchable synthetic material 40 to one surface of a sheet of the moldable synthetic substrate material, molding the blank thus formed into the desired cross-sectional configuration of the cushion 18, and then trimming the periphery of the resulting molded structure to the desired outline of the cushion.

Thus, the lower surface of the cushion 18 has molded therein the raised pads 28 separated by the transverse grooves 30 and the lengthwise groove 32, the raised end section pads 36, and a peripheral seam allowance 40. The collar region 26 is molded in the lower surface of the cushion 18 as a convexly curved region protruding in the inner direction. The collar region 26 also includes a lengthwise extending raised pad 44 which is separated from the transversely adjacent raised pads 28 by a lengthwise extending groove 46. The groove 46 forms a fold line about which the collar region 26 is turned up and back to the position shown in FIG. 2 (see also FIG. 11).

FIGS. 8–11 illustrated a preferred way of attaching the cushion 18 to the backing member 16 to complete the shoulder strap pad 10. In FIGS. 8 and 9, the backing member 16 is shown attached along its inner edge 16a to the inner edge 18a of the cushion by an inverted seam 48. The collar region 26 of the cushion is then turned up along the groove 46 and folded back over the transversely adjacent portion of the substrate 38 as shown in FIGS. 10 and 11. This brings the outer edges 16b and 18b of the backing member 16 and the cushion 18, respectively, into opposed relation, where they are joined together by a turned edge seam 50 extending along the periphery of the outer edge and the ends of the cushion, as shown in FIG. 10.

As clearly shown in FIGS. 10 and 11, the foregoing construction of the shoulder strap pad 10 provides a central portion or region 22a along the inner edge 22 of the pad 10 which not only is covered by a non-abrasive material but which is also padded and free of any seams that might chafe the user's skin. Accordingly, the collar region 22a provides a cushioned, non-chafing, non-abrasive inner edge of the pad 10 in the region of the user's neck and shoulder where the greatest pressure is brought to bear by the pad 10 during use.

Another embodiment of the cushion component 118 depicted in FIG. 14, wherein like features are designated by like reference numbers increased by 100. As shown, it differs from the embodiment of FIG. 4 only in that the central lengthwise groove 32 has been eliminated in the region of the raised pads 128. Thus, instead of the eight, generally square raised pads 28 of FIG. 4, the embodiment of FIG. 14 has four, generally rectangular pads 128 which extend transversely across substantially the full width of the shoulder pad. The extent of the non-slip material 134 on each pad 128 is also increased in the transverse direction, thereby providing a greater surface area against slippage between the pad and the shoulder.

Although FIGS. 4 and 14 show four rows of pads 28 or four pads 128, respectively, in the lengthwise direction, it will be understood that a greater or lesser number could be provided. In FIG. 13, for example, six pads 28', are shown spaced apart in the lengthwise direction.

Although the invention has been described herein by reference to specific embodiments thereof, it will be understood that such embodiments are susceptible of modification and variation without departing from the inventive concepts disclosed. All such modifications and variations, therefore, are intended to be included within the spirit and scope of the appended claims.

What is claimed is:

1. A shoulder strap pad, comprising:
   an elongated load-bearing backing member having an upper surface, a lower surface, first and second ends, and inner and outer elongated edges extending between said first and second ends, said inner edge being convexly curved over at least the regions thereof adjacent to said first and second ends; and
   an elongated cushion attached to the lower surface of the backing member, said cushion comprising:
   an elongated resilient substrate having a lower surface, an upper surface, first and second ends, and inner and outer elongated edges extending between the first and second ends thereof, said substrate inner edge being convexly curved over at least the regions thereof adjacent to the first and second ends thereof and having a central collar region extending inwardly of said convexly curved regions thereof;
   a non-abrasive material covering the lower surface of said substrate; and
   said collar region of said substrate being turned up and back in the outer direction such that at least part of the lower surface of the collar region overlies the upper surface of the region of the substrate transversely adjacent to the collar region thereof and such that the non-abrasive material on the lower surface of the collar region forms the inner edge of the pad over the length of the collar region.

2. The shoulder strap pad of claim 1, wherein said cushion is substantially coextensive with said backing member.

3. The shoulder strap pad of claim 1, wherein the collar region of the substrate comprises:
   a lengthwise-extending raised pad on the lower surface of the substrate; and
   a lengthwise-extending groove separating said raised collar pad from the transversely adjacent portion of the substrate, said lengthwise-extending collar groove forming a fold line about which said substrate collar region is turned up and folded back over the adjacent substrate region such that the collar pad and the non-abrasive covering thereon form the inner edge of the shoulder strap pad over the length of the collar region.

4. The shoulder strap pad of claim 3, wherein:
   the inner edge of the backing member is attached to the inner edge of the substrate by an inverted seam; and
   the outer edge of the backing member is attached to the outer edge of the substrate by a turned edge seam.

5. The shoulder strap pad of claim 1, wherein the substrate is comprised of moldable synthetic material.

6. The shoulder strap pad of claim 5, wherein the synthetic material is ethyl vinyl acetate foam.

7. The shoulder strap pad of claim 5 or 6, wherein the non-abrasive material comprises a stretchable synthetic material adhered to the lower surface of the substrate.

8. The shoulder strap pad of claim 7, wherein the non-abrasive material is comprised of nylon fabric.

9. The shoulder strap pad of claim 1, further comprising:
   a plurality of raised pads on the lower surface of the substrate and covered by the non-abrasive material;
   said pads being spaced apart in the lengthwise direction by transversely extending grooves in the lower surface of the substrate.

10. The shoulder strap pad of claim 9, further comprising non-slip material located on the lower external surfaces of the non-abrasive material covering said raised pads.

11. The shoulder strap pad of claim 9, wherein there are at least four of said raised pads spaced apart in the lengthwise direction of the substrate.

12. The shoulder strap pad of claim 9, further comprising at least one lengthwise extending groove in lower surface of the substrate, said at least one lengthwise groove separating said raised pads into a plurality of transversely spaced-apart pads.

13. The shoulder strap pad of claim 9, wherein said raised pads extend across substantially the full transverse width of the shoulder pad.

14. The shoulder strap of claim 9, wherein:
   said raised pads and said transverse grooves are molded in the lower surface of the substrate; and
   the non-abrasive material is adhered to the substrate prior to the molding of the substrate.

15. A shoulder strap for a bag comprising:
   at least one load-bearing strap member adapted to be attached at one or both ends thereof to a bag; and
   a shoulder strap pad attached to said at least one strap member, said shoulder strap pad comprising
   an elongated load-bearing backing member having an upper surface, a lower surface, first and second ends, and inner and outer elongated edges extending between said first and second ends, said inner edge being convexly curved over at least the regions thereof adjacent to said first and second ends thereof; and
   an elongated cushion attached to the lower surface of the backing member, said cushion comprising:
   an elongated resilient substrate having a lower surface, an upper surface, first and second ends, and inner and outer elongated edges extending between the first and second ends thereof, said substrate inner edge being convexly curved over at least the regions thereof adjacent to the first and second ends thereof and having a central collar region extending inwardly of said convexly curved regions thereof;
   a non-abrasive material covering the lower surface of said substrate; and
   said collar region of said substrate being turned up and back in the outer direction such that at least part of the lower surface of the collar region overlies the upper surface of the region of the substrate transversely adjacent to the collar region thereof and such that the non-abrasive material on the lower surface of the collar region forms the inner edge of the pad over the length of the collar region.

16. The shoulder strap of claim 15, comprising two said strap members, each attached at one end to an end of said shoulder strap pad and adapted to be attached at the other end thereof to a bag.

17. The shoulder strap of claim 14, wherein said cushion is substantially coextensive with said backing member.

18. The shoulder strap of claim 15, wherein the collar region of the substrate comprises:
   a lengthwise-extending raised pad on the lower surface of the substrate; and
   a lengthwise-extending groove separating said raised collar pad from the transversely adjacent portion of the substrate, said lengthwise-extending collar groove forming a fold line about which said substrate collar region is turned up and folded back over the adjacent substrate region such that the collar pad and the non-abrasive covering thereon form the inner edge of the shoulder strap pad over the length of the collar region.

19. The shoulder strap of claim 18, wherein:
   the inner edge of the backing member is attached to the inner edge of the substrate by an inverted seam; and
   the outer edge of the backing member is attached to the outer edge of the substrate by a turned edge seam.

20. The shoulder strap of claim 15, wherein said cushion further comprises:
   a plurality of raised pads on the lower surface of the substrate and covered by the non-abrasive material;
   said pads being spaced apart in the lengthwise direction by transversely extending groove in the lower surface of the substrate.

21. The shoulder strap of claim 20, further comprising non-slip material located on the lower external surfaces of the non-abrasive material covering said raised pads.

22. The shoulder strap of claim 20, wherein there are at least four of said raised pads spaced apart in the lengthwise direction of the substrate.

23. The shoulder strap of claim 20, further comprising at least one lengthwise extending groove in lower surface of the substrate, said at least one lengthwise groove separating said raised pads into a plurality of transversely spaced-apart pads.

24. The shoulder strap of claim 20, wherein said raised pads extend across substantially the full transverse width of the shoulder pad.

25. The shoulder strap of claim 20, wherein:
   said raised pads and said transverse grooves are molded in the lower surface of the substrate; and
   the non-abrasive material is adhered to the substrate prior to the molding of the substrate.

26. The shoulder strap of claim 15, wherein the substrate is comprised of moldable synthetic material.

27. The shoulder strap of claim 26, wherein the synthetic material is ethyl vinyl acetate foam.

28. The shoulder strap of claim 26 or 27, wherein the non-abrasive material comprises a stretchable synthetic material adhered to the lower surface of the substrate.

29. The shoulder strap of claim 28, wherein the non-abrasive material is comprised of nylon fabric.

\* \* \* \* \*